Dec. 19, 1961  R. L. GILBERT  3,013,647
CASING APPARATUS
Filed Sept. 28, 1959  4 Sheets-Sheet 1

INVENTOR.
ROY L. GILBERT
BY
Meyer, Baldwin, Doran & Young
ATTORNEYS

Dec. 19, 1961 R. L. GILBERT 3,013,647
CASING APPARATUS
Filed Sept. 28, 1959 4 Sheets-Sheet 3

INVENTOR.
ROY L. GILBERT
BY
Meyer, Baldwin, Doran & Young
ATTORNEYS

Dec. 19, 1961  R. L. GILBERT  3,013,647
CASING APPARATUS

Filed Sept. 28, 1959  4 Sheets-Sheet 4

INVENTOR.
ROY L. GILBERT
BY
Meyer, Baldwin, Doran & Young
ATTORNEYS

United States Patent Office 3,013,647
Patented Dec. 19, 1961

3,013,647
CASING APPARATUS
Roy L. Gilbert, Toledo, Ohio, assignor to Dairypak Butler, Inc., Cleveland, Ohio, a corporation of Ohio
Filed Sept. 28, 1959, Ser. No. 842,718
18 Claims. (Cl. 198—34)

This invention relates to new and improved casing apparatus and more particularly to novel apparatus especially designed for automatically casing a plurality of articles simultaneously into an open ended case or container.

A primary object of the present invention is the provision of new and novel casing apparatus especially designed to package a plurality of articles simultaneously into an open ended case, container, and the like, and wherein said apparatus is automatically operable to sequentially separate a predetermined number of articles from a plurality of articles conveyed thereto, thence operate to segregate said separated articles into a well defined compact group, and thereafter transport said group to a container loading station wherein the same is deposited into said case or container.

Another object of the present invention is the provision of new and novel casing apparatus especially designed to automatically package a separated group of articles into an open ended case, container and the like and wherein the apparatus includes means for intercepting a plurality of articles conveyed to said apparatus to thus dispose said articles in a predetermined position, means operable in conjunction with said first means to separate and compress a predetermined number of said articles from said plurality of articles to thus define a compact group, and means for transporting said group transversely of said conveying means to a container loading station where the same is thence deposited into said case or container.

Another object of the present invention is the provision of new and novel casing or packaging apparatus as defined in the preceding paragraph and wherein the means for intercepting a plurality of articles conveyed to said apparatus includes a sail member disposed in the path of conveyance of said articles, being movable therewith in partial opposition to said conveying means so as to locate said articles in a predetermined position relative to said apparatus, which apparatus is thence operable to effect a separation of a predetermined number of said articles, grouping or partially compressing the same to define a compact group, and thereafter functioning to transport said group transversely of said conveying means to a container loading position whereat the same is deposited in said case or container.

Still another object of the present invention is the provision of new and novel casing apparatus as is above defined, and wherein the means for separating a predetermined number of articles includes a sword member which is actuatable as to be interposed into the path of conveyance of the said articles and which, in turn, is thence operable in conjunction with the sail member to compress said separated group of articles to thus define a compact group, and wherein said sail and sword members thence cooperate to retain said group therebetween while the latter are transported to said container loading position for disposition into a case or container.

Still another object of the present invention is the provision of new and novel packaging apparatus especially designed to automatically package a group of articles into an open ended case, container or the like, as is above defined, and wherein the means for transporting the compacted group of articles to the container loading position includes a movable carriage which mounts the sail and sword members and which carriage is sequentially operable relative to the actuation of said supported member to transport said compacted group of articles substantially transversely to the direction of conveyance of said conveying means to carry said compacted group to a container loading position for disposition into said case or container.

Another object of the present invention is the provision of new and novel packaging apparatus as is above defined and which includes means for holding an open ended case or container in readiness at said article loading station and in position to have deposited therein said group of articles.

Other objects and advantages of the packaging apparatus of the present invention will be realized by one skilled in the art to which it pertains and upon reference to the following disclosure of a preferred embodiment thereof, and which is illustrated in the accompanying drawings forming a part of this specification, and wherein.

Figure 1:
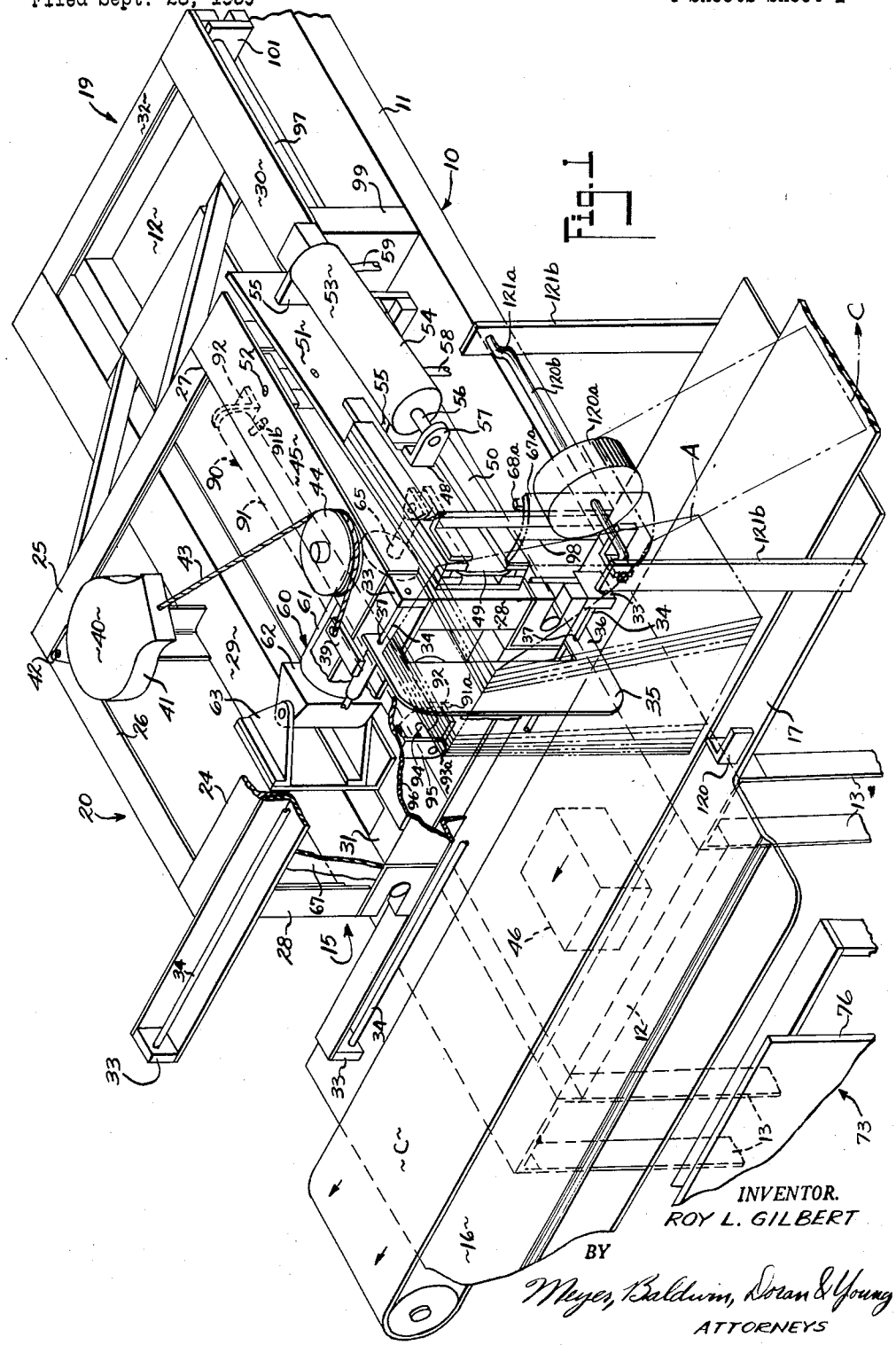
FIG. 1 is a perspective view of a preferred embodiment of casing or packaging apparatus embodying the concepts of the present invention.

Briefly, the casing apparatus of the present invention is utilized to package a plurality of articles simultaneously into an open ended case or container and may be functionally defined as being capable of operating to sequentially separate a predetermined number of articles, for example, paper board milk cartons, or the like, in a non-assembled flat condition from a plurality of said articles presented to said apparatus in a continuous row, thence group or partially compress said predetermined number of articles into a compact group or pack, and thereafter automatically transport said group to a container loading station wherein an open ended case, container or the like is awaiting to receive said group therein.

As will be hereinafter seen, the instant casing or packaging apparatus of the present invention is automatically operable to sequentially function in the manner just described.

Referring now to the drawings throughout which like elements are designated by the same reference character, the casing apparatus of the present invention is seen to include a supporting frame identified in its entirety by the reference numeral 10 and which frame comprises a pair of channel members 11 disposed preferably in substantial parallel spaced relation to each other by means of interconnected front and rear rail members 12 and supported in a raised horizontal plane above a supporting floor, or the like, by means of a plurality of upright leg members 13.

The instant casing apparatus is preferably used in conjunction with a suitable conveying means which is operable to automatically carry or convey a plurality of articles to be packaged to a preselected position, which position may also be hereinafter referred to as the article grouping or compacting position for said apparatus. Merely for purposes of the present disclosure, the conveying means herein utilized therewith is seen to be an endless belt type of conveyor, a portion of only the upper conveying run as is identified by the reference character C, being herein shown, and which run is disposed forwardly of and closely adjacent to one end of the supporting frame 10, which end is identified by the reference numeral 15, and which may be also hereinafter referred to as the front end of the apparatus. Said conveyor run C is seen to preferably extend past the front end of said frame, terminating as indicated, adjacent the left side of the frame as viewed in FIG. 1 to thus define a conveyance path, in such manner as to lie upon and slide over a flat platform as indicated at 16, the latter of which is located forwardly of the aforesaid frame 10 and disposed so that its upper surface 17 supports said run C.

Said platform 16 is preferably inclined downwardly from its right end as viewed in FIG. 1, and thence along the aforesaid conveyance path, in the direction of conveyance of the articles, the angle of inclination being preferably within the range of approximately 5–15 degrees. Said platform, if desired, may in addition, be slightly tilted upwardly toward the front face of the frame 10 substantially transversely to the direction of conveyance of said articles. It may further be desirable to provide for the adjustment of said inclination and/or tilt of said platform in accordance with the various characteristics of the article material to thus provide for an efficient handling thereof.

It is also to be understood that the instant platform may be located in a horizontal plane instead of at an inclination as preferably utilized, and function in a manner sufficient to provide for a proper conveyance and packaging of said articles.

The articles to be cased, for example the non-assembled paper board milk cartons as is aforementioned, are presented to said apparatus by the aforesaid conveyor preferably in a single row and passing directly forwardly of the front end 15 of the frame 10.

Figure 3:
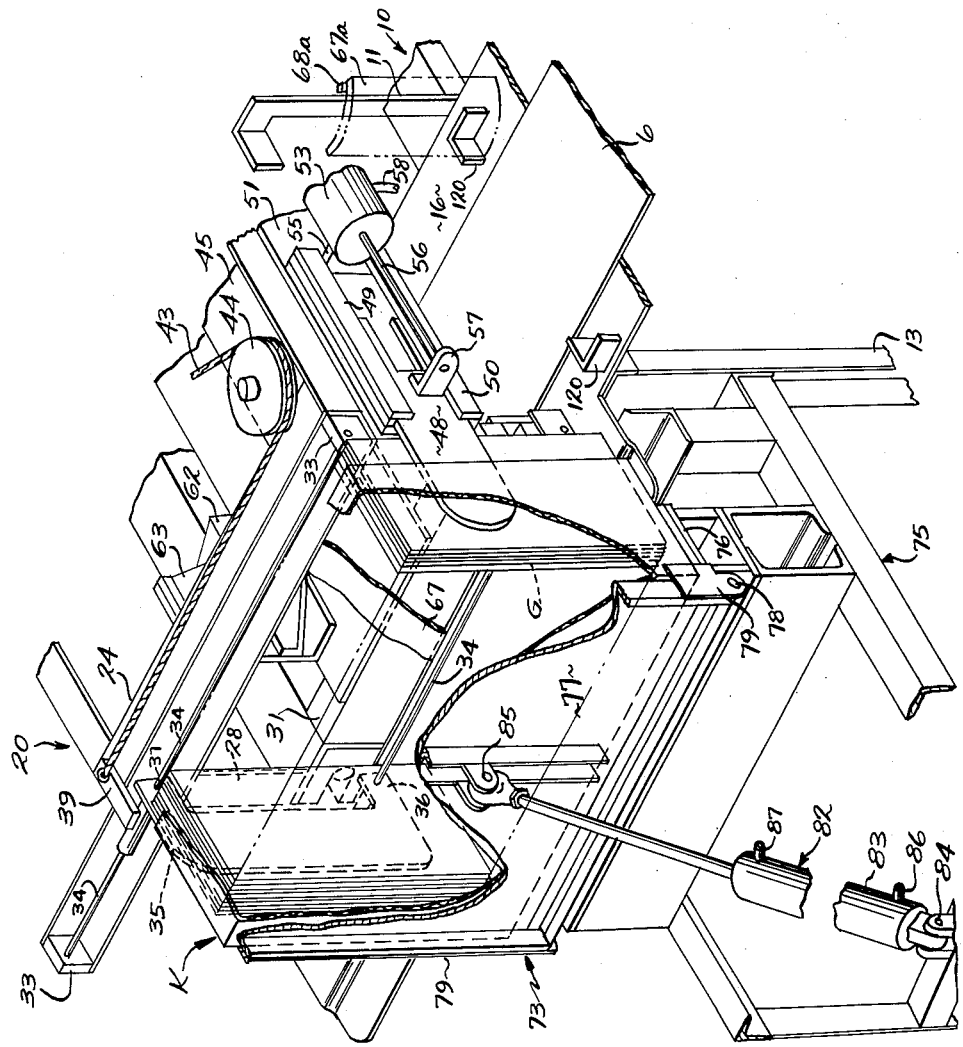
FIG. 3 is a fragmentary perspective view of the casing apparatus of the present invention being similar to FIG. 2, but with several of the parts moved to still another position occupied thereby during another part of the operating cycle of said apparatus.

The apparatus of the present invention is then operable to intercept said articles, and for this purpose, as is best seen in FIG. 1, the instant form of casing apparatus includes a lower carriage and an upper carriage, identified each in its entirety by the reference numerals 19 and 20, respectively, being formed integrally one with the other, and which, in addition, are movably supported on the said frame so as to be movable thereon between a first retracted position as is shown in FIG. 1, and a second or extended position as shown in FIG. 3.

In the retracted position said carriages are so disposed as to locate the bottom side of the lower carriage 19 slightly to one side and above the upper surface 17 of the platform 16, as seen in FIG. 1.

The upper carriage 20 is preferably rectangular in configuration and comprising a pair of front and rear frame members 24 and 25 respectively, preferably of right-angle cross sectional configuration, and which are seen to be connected at the ends thereof to opposite ends of a similar shaped pair of side frame members 26 and 27, the latter extending substantially perpendicular therebetween.

A rail member 28 is seen to be rigidly attached to the abutting ends of each of the aforesaid frame members, projecting downwardly therefrom and in turn being suitable fastened to the side frame members 29 and 30, respectively, of the lower carriage 19 to thus be, in effect, integral with said lower carriage. The side frame members 29 and 30 of said lower carriage are also seen to be of right-angle cross section, and connecting at the ends thereof to similarly shaped front and rear frame members 31 and 32.

The frame members 24 and 31 on the upper and lower carriages, respectively, are each seen to be provided at the ends thereof with a bearing block identified by the reference numeral 33 and which is rigidly fastened to said frame member as to be in substantial alignment with each other. A shaft member 34 is suspended between each pair of said bearing blocks 33 being securely anchored at its ends as to be disposed in substantial parallel spaced relation and preferably vertically one above the other.

A sail member as identified by the reference numeral 35 being preferably rectangular in configuration, is seen to have an arm 26 integrally formed on each of its ends and extending outwardly from its main body portion in substantial spaced coplanar relation, each of said arms, in turn, being preferably centrally apertured as is indicated at 37. The sail member 35 is adapted to be mounted on the aforesaid shaft members 34, the latter passing freely through the apertured arms 36, the dimensions of said shafts and apertures 37 being such as to permit said sail member to be freely slidable thereon. A pair of suitable bearing members 38, the instant form being tubular in configuration, may also be slidably disposed over said shaft members 34, being suitably attached to the left face of the sail member as viewed in FIG. 1 to thus enable said sail member to be retained in its vertical position between its supporting shaft members 34 and to enable the same to be freely slidable thereon without fear of becoming canted or otherwise misaligned. As seen in FIG. 1, the said member 35, as thus suspended, is disposed forwardly of the upper carriage 20, extending over the aforesaid platform 16 while being preferably substantially perpendicular to the forward face of said carriage and is disposed, while said carriage is in its retracted position, in the line of conveyance of the articles presented by the conveyor to said apparatus. Hence, said sail member is in position to intercept and sense the presence of said articles being presented to the instant packaging apparatus.

The articles as conveyed by the conveyor run C, herein shown to be preferably disposed in a single row thereon and tilted or inclined forwardly in the direction of conveyance, as identified by the reference character A, are carried over the upper surface 17 of the aforesaid platform 16 and hence are intercepted by the sail member 35, said sail member being slidably moved by said articles along its supporting shaft members 34 in the direction of conveyance.

It is intended that while said sail member is moved by the conveyed articles, it also is operative to partially oppose the conveyance of the latter to result in said articles moving to a substantially vertically upright position. For this purpose, the sail member 35 is provided with a tie bar 39 which is seen to have its one end securely anchored to the upper bearing member 38 so as to project rearwardly over the upper carriage 20. A spring box 40, as is commonly referred to in the art, is seen to have one end of its housing 41 pivotally anchored at 42 to the rearward portion of the side upper carriage member 26, as is seen in FIG. 1. Said spring box is provided with a flexible cable as is indicated at 43, and which, as will be understood, is under a predetermined variable spring tension tending to draw said cable into the aforesaid housing. Said cable is seen to extend around a pulley member 44 rotatably carried on a plate member 45 mounted on top of the upper carriage 20, preferably adjacent the front, right-hand corner thereof and has its end securely anchored to the aforementioned tie bar 39. With this construction, the sail member 35 is normally urged along its supporting shaft members 34 by said spring box assembly toward the right as viewed in FIG. 1. The loading of the spring box may also be varied, if so desired, to accommodate for various characteristics of the articles being cased, for instance, the stiffness and thickness of the article material, and/or its weight, etc.

With this construction, it will now be seen that as the row of articles is conveyed to the instant apparatus and moves over the platform 16 past the front end of the upper carriage 20 as seen in FIG. 1, the sail member is engaged and moved therewith being partially opposed by the aforementioned variable spring pressure of the spring box assembly 40. Said sail member is thus effective to tend to slow down or partially hold back the conveyance of said articles to thus result in said articles bunching or stacking more closely together while moving to a substantially vertically upright position.

To assist in the bunching or stacking of the articles as the same are conveyed by conveyor run C over the platform 16, a suitable electrically actuated vibrator device of conventional construction identified in its diagrammatic form by the reference numeral 46, is securely fastened to the underside of the aforesaid platform 16. Said vibrator device is connected to a suitable source of electrical energy and is thus operable to generate mechanical vibrations which are thence applied to the said platform 16. Said vibrator is preferably of the type wherein the magnitude of the vibrations may be varied if so desired. With the platform 16 being tilted toward the front face of the frame 10 and also inclined downwardly along the conveyance line and in the direction of the conveyance of the articles to be cased, said articles are thus agitated in their endwise position, said agitation plus the disposition of the platform 16 and in conjunction with the opposition afforded by the aforesaid spring box 40 being thus effective to result in said articles to literally "walk" toward the sail member 35 to said vertical upright position.

As said row of articles is thus conveyed past the front end of the upper carriage 20 in the aforesaid upright position, carrying the sail member 35 therewith, the instant casing apparatus is thence operable to separate a predetermined number of articles from said row and to thereafter partially compact the same to define a segregated or compacted group.

To accomplish this, a sword member 48 is slidably mounted within opposed track elements 49 and 50 carried on a flat supporting plate 51, said plate being, in turn, pivotally mounted at its rearward end to said upper carriage as at 52, in substantially a vertical position and closely adjacent the right side of said carriage, as viewed in FIG. 1. Said sword member is thus disposed in a vertical plane and is adapted to be movable transversely of and over the platform 16 and insertable into the aforesaid row of articles to thereby separate a predetermined number of said articles between it and the sail member 35. To accomplish the actuation of said sword member, reference is directed to FIG. 1, wherein a pressure fluid motor as is indicated at 53, is seen to have its cylinder 54 suitably mounted at its ends on a pair of bracket members 55, the latter in turn being rigidly fastened to the aforesaid plate member 51. The piston rod of said motor, as is indicated at 56, is suitably anchored to a bracket 57 attached to the rearward end of the aforementioned sword member 48. The pressure fluid motor 53 is connectable in circuit by means of conduits 58 and 59 with a suitable source of pressure fluid, later to be described, to thus enable said motor to be actuated in a manner as to slidably move the sword 48 along its supporting tracks 49 and 50 to thus project the same forwardly of the supporting frame 10 and hence into the row of articles being conveyed by the said upper run C of the conveyor.

Normally in its retracted position, the sword member 48 is disposed so as to be slightly rearwardly of the front end 15 of the apparatus supporting frame 10 to thus freely permit the conveyance of the articles by the aforesaid conveyor. Upon a predetermined number of articles passing said sword member, the latter is thence actuated by said pressure fluid motor so as to be extended into the conveyed row of said articles to thereby separate said predetermined number from the remaining articles in said row.

The fluid and electrical control means for providing the energization of the said motor 53 and for controlling the sequential operation of the other other components of the instant apparatus herein disclosed to thus perform a cyclic casing or packaging of said articles will be hereinafter described in detail.

Upon the sword member being fully extended into the aforesaid row of conveyed articles, it is thence intended to be operable in conjunction with the aforesaid sail member 35 to compact or compress said separated group therebetween into a segregated or compact group or pack.

To accomplish this latter result, a pressure fluid motor, as identified by the reference numeral 60, is seen to have the closed end of its cylinder 61 pivotally anchored by means of swivel block 62 to a bracket 63 carried within the aforementioned upper carriage 20 preferably adjacent its forward end. Said cylinder 61 is connectable by means of conduits 61a and 61b to the aforementioned source of pressure fluid, as will be later disclosed in detail. The piston rod 65 of said pressure fluid motor 60 is securely pivotally fastened to the plate member 51, on the face thereof opposite the sword member 48 and spaced forwardly of its pivotal connection at 52.

With this construction, and with a proper actuation of the pressure fluid motor 60, the sword assembly may be swung about its pivot 52 toward or away from its associated right-hand side of the upper carriage 20 as viewed in FIG. 1. Prior to actuation of motor 60, the sword assembly is disposed so as to position the forward end of the aforesaid plate 51 and hence the sword member 48 in spaced relation to the adjacent side of said upper carriage. Thereafter, said sword member is first extended as above mentioned forwardly of said carriage by its fluid pressure motor 53 to thus project into the row of conveyed articles as to separate a predetermined number between it and the sail member 35. The fluid motor 60 is thence actuated and the sword assembly is pivoted about its pivot 52 clockwise or to the left as shown in FIG. 1, toward said sail member to thus compact or compress the separated articles disposed therebetween into a compact group or pack.

A flat plate 67 attached to the front face of the upper carriage 20 is operative to retain the articles as thus separated and compacted as a uniform and well oriented group, and as will be hereinafter apparent, said plate is also operative to assist in the transfer of the compact group to and into the awaiting case or container. If so desired, a vertically disposed rearwardly curved guide plate 67a may be mounted to suitable structural members 68a adjacent to and upstream from the aforesaid sword member assembly, said guide plate being thus effective to assist in properly guiding the articles to be cased as the same are carried onto the platform 16.

Figure 2:
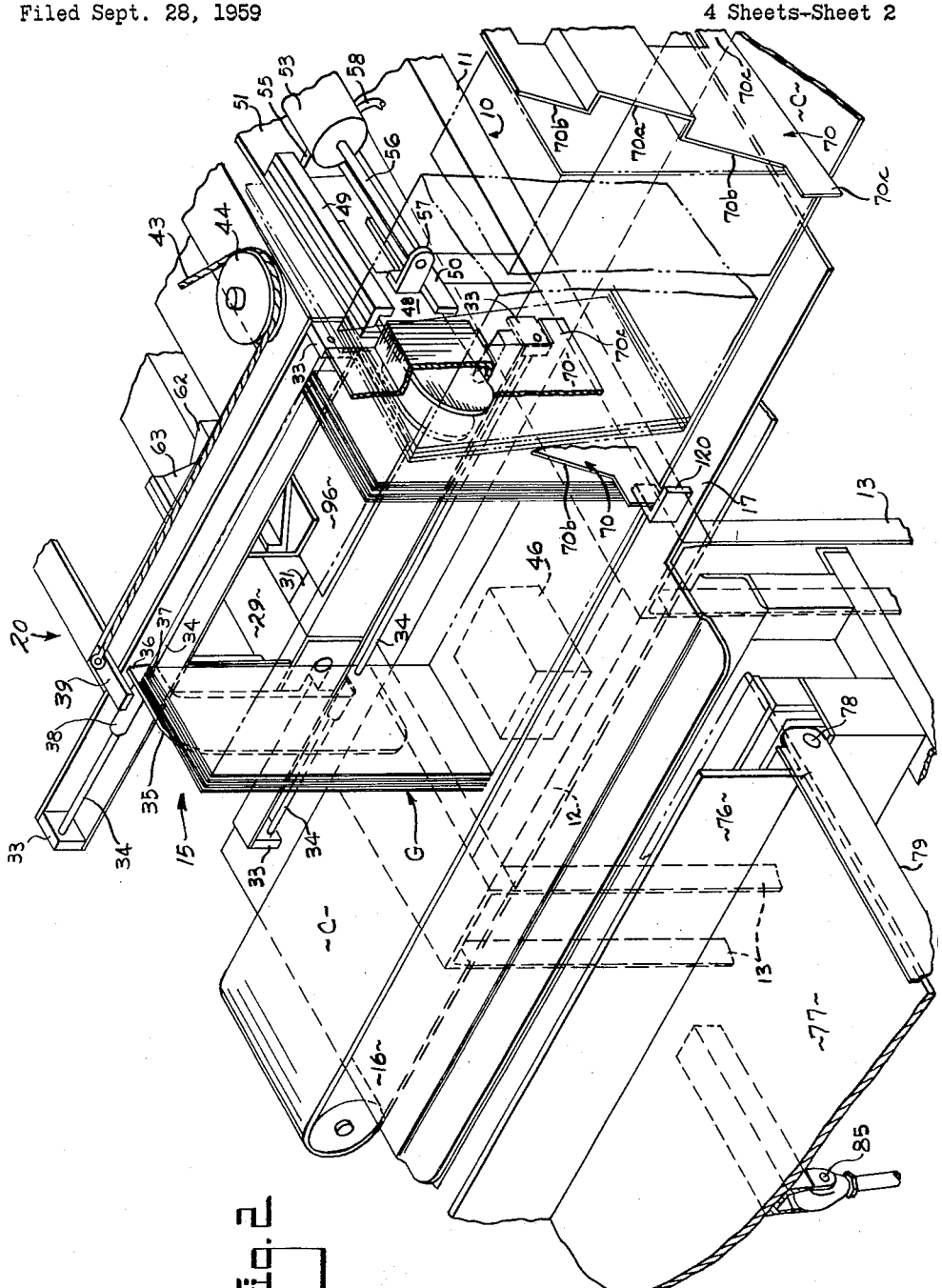
FIG. 2 is a fragmentary perspective view of the casing apparatus shown in FIG. 1 and with several of the parts thereof moved to a position occupied by said machine parts at a predetermined time during the operating cycle thereof.

To enable the sword member 48 to be readily insertable into the row of articles being conveyed therepast, a suitable separator, as is identified by the reference character 70 in FIG. 2, may be insertable by the operator between adjacent articles in said row at predetermined intervals to thus divide the same into prearranged groups of any preselected number of articles. In its instant form, said separator is seen to be somewhat triangular in configuration and to have a central recessed portion 70a integrally joined at either end to an arm member 70b. The operator places each separator 70 into the row of conveyed articles in such manner that the recessed portion 70a is located so as to accommodate and receive the sword member 48 to thus assure its being readily insertable into said row of articles.

With the actuation of the pressure fluid motor 60 so as to swing the sword assembly clockwise about its pivot 52 and toward the sail member 35 to thus compact the group of articles therebetween, the instant casing apparatus is thereafter intended to be operable so as to transport said compacted group as identified by the reference character G, transversely across and over the platform 16 and into an open ended case or container as is identified by the reference character K.

The container K is seen to be carried on a table 73, said table, in turn, being disposed on a supporting frame 75 located on the opposite side of the platform 16 relative to the frame 10. As best seen in FIG. 3, the table 73 is substantially of right angle configuration having a part 76 of narrow dimension integrally connected to part 77, the latter being substantially of larger dimension. Said table 73 is seen to be hingably connected, at the apex of its parts 76 and 77, to the aforesaid supporting frame 75 by means of hinge pin 78.

At the beginning of the casing cycle, the container table 73 is positioned so that its part 76 extends substantially vertically upwardly from the table part 77, the latter hence being disposed in substantially a horizontal plane.

With said table thus positioned, the container K is placed either manually or automatically upon the table part 77 with its open end facing upwardly. Thence, at an appropriate time during the casing cycle, as will be hereinafter described in greater detail, the table 73 is swung clockwise as viewed in FIG. 1 about its hingable connection 78 to thus present said container with its open end directly across from and facing the aforesaid carriage 20.

As best seen in FIG. 3, the table part 77 of the container table 73 is preferably provided with slide rail members 79 which are also mounted on the aforesaid hinge pin, being operable to embrace opposite sides of the container K so as to retain the latter on the table 73. Either or both of said rail members 79 may be slidable on the hinge pin 78 to thus accommodate various sizes of case or container.

A pressure fluid motor 82 is seen to have the closed end of its cylinder 83 pivotally attached as at 84 to the table supporting frame 75, and the free end of its piston rod suitably anchored at 85 to the underside of the table part 77. Said motor is connected by way of conduits 86 and 87 to the aforesaid suitable source of pressure fluid and is intended to be actuatable preferably at a particular time in the operating cycle of said apparatus, as will be hereinafter described, to swing the aforementioned table 73 to its vertical position and thus present said container K to the carriage 20 for receiving the compacted group of articles carried thereby.

To provide for the transportation of said compact or compressed group of articles transversely across and over the platform 16 and into the container K, a pressure fluid motor 90 is seen to have its cylinder 91 suitably mounted at each end on a bracket 92, the latter, in turn, being securely fastened to and projecting upwardly from a plate 93a attached to the frame 10 preferably being supported upon and extending between its front and rear rail members 12. The piston rod of said motor, as indicated at 94, has its free end suitably anchored to an arm 95 attached to the underside of anchor plate 96 carried upon and preferably extending centrally between the front and rear frame members 31 and 32, respectively, of the lower carriage 19. Said motor 90 is intended to be connected in fluid circuit by means of conduits 91a and 91b, said source of pressure fluid and actuatable in a manner as to be hereinafter more fully described, so as to propel the upper and lower carriage forwardly and transversely across the aforesaid platform 16 and toward the container K.

To provide for this movement of the upper and lower carriages a rod member 97 is seen to be located on each side of the lower carriage 19 and to have its forward end anchored to one end of the front frame member 31 of said carriage. Said rod members thence extend rearwardly along the sides of the lower carriage, each being slidably supported within a bearing block 98 mounted upon each of the channel members 11 of the frame 10 closely adjacent its front end and a second bearing block 99 spaced along each of said channels from said bearing block 97 and mounted toward the rear of said frame. The lower carriage 19, in addition, is fastened to each of the rod members 97 at a point intermediate the said bearing blocks, said rod members being also anchored within a retainer or stop block 101 carried on each end of the rear frame member 32 on the lower carriage 19.

Figure 4:
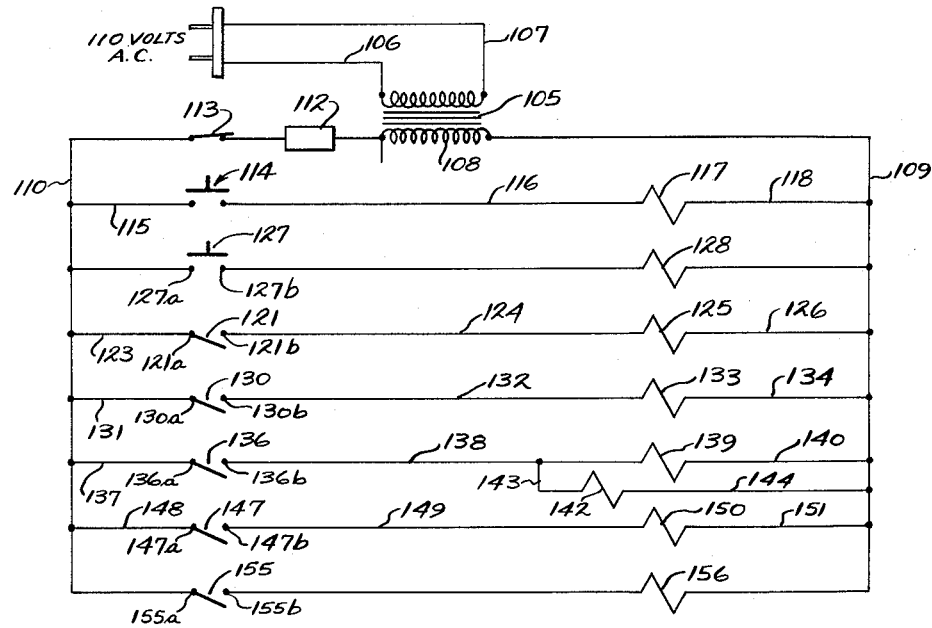
FIG. 4 is a schematic electrical wiring diagram showing one embodiment of electrical control circuit for connecting the several parts of the casing apparatus in electrical circuit with each other.

Said rod members, as thus disposed, hence slidably support the upper and lower carriages on the frame 10, and upon an actuation of the aforesaid motor 90 as to force its piston rod 94 forward, said carriages also slidably move as an integral unit in a forward direction across the platform 16 to a position as is seen in FIG. 4, which position may also be referred to hereinafter as the casing loading position. The group of articles G as thus carried between the sail and sword members are hence moved to said latter position and deposited in said container K. The aforementioned retainer or stop blocks 101 carried on the rearward ends of each of the rod members 97 at the end of forward stroke of the upper carriage 20 are each adapted to engage with one of the aforesaid bearing blocks 99 to thus define the forwardmost location of said upper carriage in said casing loading position.

The number of articles selected for packaging per each operating cycle of the instant casing apparatus is such that once said articles are compacted between the sail and sword members, said members are preferably spaced apart a distance slightly less than the width of the opening in the container K. In this manner, when the upper carriage 20 is thereafter propelled forwardly of the supporting frame 10 and across the platform 16 in its article casing stroke, the sail and sword members partially extend into the said container K adjacent the inner surfaces of the side walls thereof.

Consequently, the number of said articles to be packaged per each cycle depends upon the size of the case or container K; the operator hence determining the proper number of articles for disposition therein and inserting the aforementioned separators 70, each at corresponding intervals in the conveyed row of articles A as seen in FIG. 2.

Immediately after the entrance of the sail and sword members into said case or container K, the pressure fluid motor 53 is thence reversely actuated to retract the sword member within its track elements 49 and 50, the aforesaid plate 67 on the front of the carriage 20 retaining said group in said container K.

Also, and preferably at the same time the motor 53 is actuated, the motor 60 is reversably actuated to swing the sword assembly away from the side of the upper carriage 20, or in a counterclockwise direction, as viewed in FIG. 1.

Preferably, though not required, the speed of fluid motor 53 in retracting the sword member 48 is substantially greater than the speed of fluid motor 60. In this manner, it is intended that the sword member 48 be substantially completely retracted within its track elements 49 and 50 before the sword assembly is swung about its pivot 52 to return to its FIG. 1 position.

The upper and lower carriages are thereafter retracted by means of reversely actuating the pressure fluid motor 90 and thus returned to the position therefore rearwardly of the platform 16 to thus await a subsequent casing or packaging cycle.

As previously mentioned, the instant casing apparatus is automatically sequentially operable in the manner just described to: first, separate a predetermined number of articles from the row of articles A presented thereto; second, to compact or compress said predetermined number of articles into a defined compact group or pack; and, third, to dispose said compact group into the case or container K.

To accomplish this, the aforementioned various components of the casing apparatus are connected in a combination electrical-fluid control circuit now to be described which is operable to control the operation of said apparatus in the manner as above defined.

With reference now directed particularly to FIG. 4, a schematic wiring diagram is herein shown embodying an electrical control circuit especially adaptable for use with the instant apparatus, and which is seen to include a power transformer, as identified by the reference numeral 105, connected by means of wires 106 and 107 across a suitable source of electrical energy, preferably of 110 volt A.C. magnitude, said transformer being effective to provide a suitable control voltage available at its secondary winding 108, the magnitude of which is preferably approximately 10 volts A.C.

The transformer secondary winding 108 is seen to be connected at its ends to power leads 109 and 110 respectively, said power lead 110, in addition, having a fuse element 112 interposed in series therewith to thus control the magnitude of current flow therethrough, and a normally closed switch element 113 also connected in a series relation with said fuse element and power lead 110, the purpose for which will be hereinafter described in detail.

To perform the first operation of the instant casing apparatus, i.e., the separation of a predetermined number of articles from the row of conveyed articles, the instant electrical control circuit includes a switch element 114, preferably of the push button type being, in addition, normally in its opened condition and having one of its contacts connecting through wire 115 to the aforesaid power lead 110, and the remaining contact connecting by means of wire 116 to one side of coil 117 of a conventional solenoid actuated fluid control valve, identified in its diagrammatic configuration by the reference character $V_1$. The opposite end of said solenoid coil 117 is shown to be connected by means of wire 118 to the remaining power lead 109.

Figure 5:
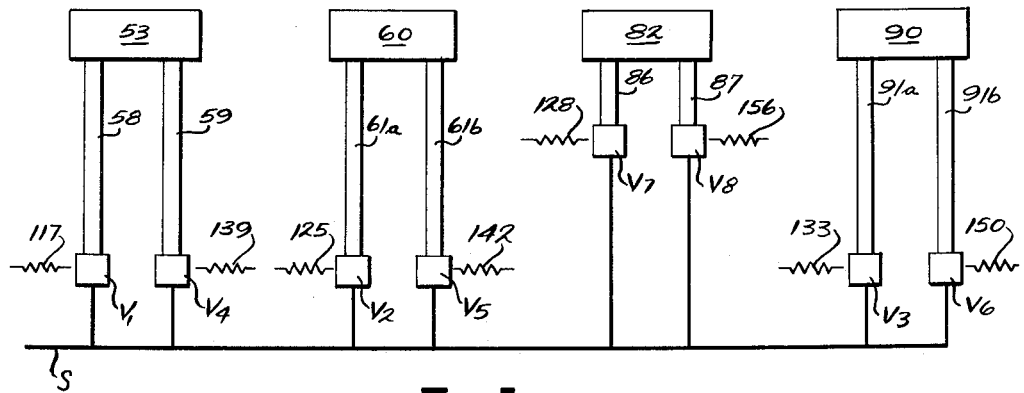
FIG. 5 is a diagrammatic illustration of a fluid circuit especially adapted for use with the electrical control circuit of FIG. 4.

With reference directed to FIG. 5 wherein is shown a preferred embodiment of fluid control circuit used in conjunction with the aforesaid electrical control circuit of FIG. 4, it is therein seen that the valve $V_1$ is connected to a source of pressure fluid, such as compressed air as is identified by the supply conduit S.

This solenoid actuated fluid control valve $V_1$, as will be well understood, is connected in fluid circuit with the conduit 58 of motor 53 and fluid source S, and operable in such manner that when the switch element 114 is closed, energizing the coil 117, the flow of air through said solenoid valve is such as to project the sword member 48 forwardly of the upper carriage 20 and into the central recessed portion 70a of one of the separators 70 disposed in the row of conveyed articles A.

The switch element 114 may be mounted at any position convenient to the operator so as to be readily actuatable by him when so desired.

To assist the operator in the determination of when he should energize the fluid motor 53, a plurality of stop members 120 are mounted preferably opposite and forwardly of the aforesaid sword assembly, being in position to engage with the separator 70 and thus operable to stop its conveyance directly in front of said assembly. As seen in FIG. 1, one of said stop members 120 is preferably mounted on the platform 16 on each side of the conveyor run C while a third is mounted on one of the structural members 68a carrying the aforementioned guide plate 67a.

The separator 70 is integrally formed with a plurality of outwardly projecting tongues 70c and which are adapted to engage with the aforesaid stop members 120 to thus stop the conveyance of said separator. The aforementioned guide plate 67a is seen to have its bottom edge spaced upwardly from the surface 17 of the platform 16 so as to permit the lower tongue 70c to pass therebetween. At the instant the separator member is thus stopped by the stop elements 120, its recessed portion 70a is directly forwardly of the sword member, the latter being in its retracted position, and thus in position for projection into said separator.

It will also be apparent that as each separator member is thus stopped by the aforesaid stop elements 120, the conveyance of the separated group of articles located rearwardly thereof are momentarily stopped. The separated articles located ahead of the separator member continue to move along due to their frictional engagement with the supporting conveyor C thus tending to partially group said articles together. And, as the sail member continues to be moved along said conveyor by said articles the resistance against said movement exerted by the spring box assembly 40 also gradually increases until the pressure exerted on said sail member by said articles and said spring box are substantially equal. At approximately this instant, the movement of the sail member is stopped thus likewise stopped the further conveyance of the articles located ahead of the separator member.

With said row of articles located rearwardly of the separator 70 hence stopped, and with additional articles being continually moved by the conveyor run C toward the instant machine, said latter row may tend to bunch or pack together and may possibly tip backwards along the conveyance path such that the bottom edge of each article is located forwardly of the top edge. To prevent this from occurring, a suitable roller, as indicated at 120a in FIG. 1, is rotatably carried on a shaft 120b, the latter, in turn, being preferably integrally formed with an arm member 121a at each of its ends by which said shaft 120b is swingably mounted to a pair of bar elements 121b. Said bar elements 121b are preferably mounted upon the conveyor supporting framework (not herein shown in detail) so as to be suspended over the conveyor run C. Said roller is intended to engage the top edge of each article as it passes thereunder and thereby move it to still a greater angular inclination with the top edge forwardly of its bottom edge to thereby assure its being properly presented to the sail member.

It will also be apparent to the artisan that the switch element 114 may be actuated by one of the separator tongues 70c striking its associated stop element 120. For example, a normally open switch element may be mounted on one of said stop elements in place of switch element 114 and operated directly by its associated separator tongue as the latter engages said stop member.

As the sword member 48 is fully extended into the conveyed row of articles, it is thence effective to initiate the actuation of the fluid motor 60, so as to swing the same to the left or in a clockwise direction, as viewed in FIG. 1, to thus compact or compress the group of articles between it and the sail member 35 to thus define the aforementioned compact article group G. To accomplish this, a switch element as indicated diagrammatically in FIG. 4 by the reference numeral 121, and which is seen to have a pair of normally open contacts 121a and 121b, is connected by means of said contact 121a and wire 123 to the power lead 110 and by means of contact 121b and 124 to one side of coil 125 of a conventional solenoid actuated fluid control valve, the latter being identified in FIG. 5 by the reference character $V_2$ and which is likewise connected in fluid control relation to the cylinder 61 of fluid motor 60 by means of conduit 61a and to the aforesaid source S. The opposite end of the solenoid coil 125 is connected by means of wire 126 to the remaining power lead 109. Switch element 121 is preferably mounted on the supporting plate 51 of the sword assembly and thus in a position to be actuated to its closed position by the sword member 48 when it is fully extended into the conveyed row of articles. Upon the switch element 121 being actuated to its closed position, the solenoid coil 125 is thence connected across the power leads 109 and 110, being energized thereby to, in turn, cause the actuation of pressure motor 60 and thus swing the sword assembly about its pivot 52 and thereby compact or compress the separated group of articles between it and the sail member 35 to thus define the aforementioned compact article group or pack G.

At a convenient time during the casing cycle, the container table 37 is swingable to its vertical position as to locate the open end of the container K across from and in position to receive the article group G.

For this purpose, a switch element 127 preferably of the push button type and having a pair of normally open controls 127a and 127b is located convenient to the operator so that he may readily actuate the same. The switch contact 127a is connected to the aforesaid power lead 110 whereas contact 127b is connected to one end of coil 128 of a conventional solenoid operated fluid control valve identified in FIG. 5 by the reference character $V_7$. The opposite end of said coil 128 is seen to be connected to the power lead 109. The control valve $V_7$ is seen to be connected in control relation with fluid motor 82 by means of the aforesaid conduit 86 and to the fluid (air) source S.

Upon actuation of the switch element 127 to its closed position, coil 128 is thus energized to effect the operation of control $V_7$. As a result, fluid motor 82 is operated to propel its piston rod outwardly of its cylinder 83, and table 73 thus swings upwardly about hinge pin 78 to its FIG. 3 position to locate the container K in its receivable position.

It is also apparent to the artisan, that the switch element 127 may be located on the instant apparatus, and automatically operable to thus raise said table. For example, switch element 127 may be carried on the upper carriage 20 and actuated by the sword assembly being moved to its compressing position. Other equivalent circuit arrangements are also readily ascertainable without the necessity of describing the same herein, and are considered within the inventive concepts as are herein disclosed.

As the sword assembly is pivoted and moved toward the adjacent side of the upper carriage 20 to thus compact or compress the aforesaid separated articles, it is thence operable to initiate the operation of the fluid motor 90 and thereby provide for the propulsion of the upper and lower carriages 20 and 19 as an integral unit to the casing loading position wherein the articles of the compacted group G are deposited in the awaiting container K.

For this purpose, a suitable switch element as identified by the reference numeral 130 and which preferably has a pair of normally open contacts 130a and 130b is mounted on the carriage 20 and in position to be actuated by the sword assembly when the latter has been moved to a position closely adjacent its associated right hand side of the said upper carriage as shown in its dotted line position in FIG. 2. The switch element 130 is seen to be connected by its contact 130a and wire 131 to the power lead 110 and by contact 130b and wire 132 to one end of coil 133 of conventional solenoid actuated fluid control valve $V_3$ as identified in FIG. 5, the remaining end of said coil being connected by means of wire 134 to the remaining power lead 109. Said valve $V_3$ is connected by means of the aforementioned conduit 91a in control relation to the cylinder 91 of fluid motor 90 and to the aforesaid fluid source S. With this circuit, it will be seen that upon the energization of coil 133, the valve $V_3$ is actuated to thus operate fluid motor 90 in such manner as to propel the carriages 19 and 20 forwardly of the aforementioned platform 16 and toward the awaiting casing or container K to thus deposit the compacted group of articles G carried thereby into the latter.

As the upper carriage 20 reaches its forwardmost position in its casing loading stroke, to thus deposit the group of articles G into said container K it is therein desirable to initiate the return of the carriages 19 and 20 to their retracted position and thus ready the instant apparatus for a subsequent casing stroke. For this purpose, a switch element identified by the reference numeral 136, preferably having a pair of normally open contacts 136a and 136b, is located on the frame in such position as to be actuatable to its closed position in response to and preferably by the said carriage 20 as the latter moves to its extended position. As seen in FIG. 5, the switch element 136 is herein diagrammatically shown in its normally opened position and having its one contact 136a connected by means of wire 137 to the aforesaid power lead 110 and its remaining contact 136b connected by means of wire 138 to one side of coil 139 of conventional solenoid actuated fluid control valve $V_4$ and which valve is also in the fluid control circuit with the fluid motor 53 connecting with the cylinders thereof by means of conduit 59 and also to said fluid source S. The opposite end of said solenoid coil 139 is seen to be connected by means of wire 140 to the power lead 109. With this circuit, it will hence be realized that upon the closing of the normally open contacts of switching element 136, power is delivered to said solenoid coil 139 to effect its energization and operate its solenoid valve and thereby provide for an air flow to the fluid motor 53 through said conduit 59. Said motor is thence reversibly actuated to force its piston rod 56 into its cylinder 54 which, in turn, is thus effective to retract the attached sword member 48. In this manner, said group of articles G is released from between the sail and sword members 32 and 48, respectively, and deposited within the casing or container K.

As the sword member is thus retracted to release the group of articles G, it is also desirable at this time as is above mentioned to swing the sword assembly about its pivot 52, in a counterclockwise direction to return the sword member to its solid line position as shown in FIG. 2. For this purpose, a coil 142 of a conventional solenoid actuated fluid control valve $V_5$ is connected by means of wires 143 and 144 across the aforesaid coil 139. As seen in FIG. 5, said valve $V_5$ is connected in control relation with the motor 60 by means of conduit 61b and also to the fluid source S. With this circuit therefore, the solenoid coil 142 is energized with the energization of coil 139, and its associated fluid control valve $V_5$ is connected in circuit with the fluid motor 60 as to actuate the same and cause its piston rod 65 to move outwardly of its cylinder 61 and thereby swing the sword assembly about its pivot 52 and away from the adjacent side of said upper carriage. And, as is previously mentioned, the speed of reaction of motor 53 is preferably substantially faster than that of motor 60 so that the sword member 48 is retracted prior to its being swung to said latter position.

As the sword assembly swings about its pivot 52 to its counterclockwise position, it initiates the return of the aforesaid carriage components 19 and 20.

For this purpose, a switch element identified by the reference numeral 147, is herein diagrammatically shown in FIG. 4 to have a pair of normally open contacts 147a and 147b. The switch element 147 is preferably mounted on the upper carriage 20 and actuated by the sword assembly as the latter swings to its counterclockwise position subsequent to depositing the article group G in said container K. Contact 147a of said switch element is seen to be connected by means wire 148 to the power lead 110 whereas the opposite contact 147b is seen to be connected by wire 149 to one side of a coil 150 of conventional solenoid actuated fluid control valve $V_6$, the latter being included within the fluid circuit connecting with the aforementioned fluid motor 90 by means of conduit 91b and to said fluid source S. The opposite end of the solenoid coil 50 is connected by means of wire 151 to the remaining power lead 109. With this particular circuit, it will be realized that upon the actuation of the switch element 146 to its closed position, power is thence delivered across the coil 150 to effect the energization of its companion fluid control valve $V_6$. It is intended, that upon the energization of the solenoid coil 150 its associated fluid control valve is effective to cause the actuation of fluid motor 90 such as to retract its piston rod 93 into its cylinder 91 thus resulting in moving the upper and lower carriages 20 and 19 as an integral unit rearwardly over the supporting frame 10 and to thereby return the same to the retracted position therefor as hereinabove defined, whereby said carriage components are in position to await a subsequent packaging cycle.

During the return stroke of the carriage components 19 and 20, the container table 73 may be swung to its horizontal position so that the filled container may be removed and another one placed on said table.

For this purpose, a switch element 155, having preferably a pair of normally opened contacts 155a and 155b is mounted on the frame 10 and actuated by the lower carriage 19 to initiate the swinging of said container table.

As seen in FIG. 4, switch contact 155a is connected to power lead 110 whereas contact 155b is connected to one end of coil 156 of a conventional solenoid operated fluid control valve $V_8$, as identified in FIG. 5. The opposite end of coil 156 is seen to be connected to power lead 109. The control valve $V_8$ is connected in control relation by conduit 87 to fluid motor 82 and also to the aforementioned fluid (air) source S.

Upon actuation of the switch element 155 to its closed position, coil 156 is energized to effect the operation of control valve $V_8$. As a result, fluid motor 82 is operated to draw its piston rod inwardly of its cylinder 83 which is thus effective to swing the container table to its horizontal position as seen in FIG. 1.

When the container table has returned to its horizontal position, switch element 113, as seen in FIG. 4, and preferably carried on the container table part 76, is actuated to its open position thereby opening the control circuit and thus disconnecting the above described electrical control elements from the electrical power source.

In this manner, the instant control circuit incorporates a safety feature therein and hence prevents any of the said control elements from being inadvertently energized. Switch element 113 must be re-closed before the next casing cycle for the instant casing apparatus may be accomplished.

Having thus described a preferred embodiment, it is understood that the casing apparatus as is herein disclosed may be susceptible to various combinations, modifications and arrangements of parts without departing from the inventive concepts of the invention as is defined in the claims.

What is claimed is:

1. In a casing apparatus, conveying means for carrying a plurality of articles along a conveyance path, a frame, means supported on said frame disposed in said conveyance path, intercepting and movable by said articles along said path, means supported on said frame being extendable into said conveyance path and operable with said intercepting means to define separating means for separating a predetermined number of said articles, means responsive to said extendable means for providing movement of at least one of said separating means along said path effective to compress said predetermined number of articles into a compact group, and means for providing movement of said separating means for transporting said group from said path to a container loading station.

2. In a casing apparatus, conveying means for carrying a plurality of articles along a conveyance path, a frame, means supported on said frame disposed in said path, intercepting and movable by said articles along said path, means operatively connected with said last named means effective to partially restrain the movement thereof and said articles along said path, means movably supported on said frame being extendable into said conveyance path and operable with said intercepting means to define separating means for separating a predetermined number of said articles, means responsive to locating said extendable means in said path to effect a movement of the latter along said path and compress said predetermined number of articles into a compact group, and means for providing movement of said separating means for transporting said group from said path to a container loading station.

3. In a casing apparatus, conveying means for carrying a plurality of articles along a conveyance path, a frame, means supported on said frame disposed in said path, intercepting and movable by said articles along said path, means operatively connected with said last named means effective to partially restrain the movement thereof and said articles along said path, means movably supported on said frame and normally disposed remote from said path to permit said articles to move therepast, said last named means being selectively extendable into said path and operable with said intercepting means to define separating means for separating a predetermined number of said articles, means responsive to locating said extendable means in said path to effect its swingable movement along said path toward said intercepting means to thus compress said predetermined number of articles into a compact group, and said separating means being actuatable to transport said group from said path to a container loading station.

4. In a casing apparatus, conveying means for carrying a plurality of articles along a conveyance path, a frame, carriage means on said frame, means supported on said carriage means and disposed in said path, intercepting and movable by said articles along said path, means movably supported on said carriage means being extendable into said conveyance path and operable with said intercepting means to define separating means for separating a predetermined number of said articles, means responsive to said extendable means to effect a movement of at least one element of said separating means and compress said predetermined number of articles into a compact group, and said carriage means being actuatable to carry said group from said path to a container loading station.

5. In a casing apparatus, conveying means for carrying a plurality of articles along a conveyance path, a frame, carriage means on said frame, means supported on said carriage means and disposed in said path, intercepting and movable by said articles along said path, means movably supported on said carriage means and normally disposed remote from said path to permit said articles to move therepast, said last named means being selectively extendable into said path and operable with said intercepting means for separating a predetermined number of said articles, means responsive to locating said extendable means in said path to effect its movement along said path and compress said predetermined number of articles into a compact group, and said carriage means being actuatable to carry said group from said path to a container loading station.

6. In a casing apparatus, conveying means for carrying a plurality of articles along a conveyance path, a frame, carriage means on said frame and disposed adjacent said path, means supported on said carriage means and disposed in said path, intercepting and movable by said articles along said path, means swingably supported on said carriage means and normally disposed remote from said path to permit said articles to move therepast, said last named means being selectively extendable transversely of and into said path and operable with said intercepting means for separating a predetermined number of said articles, means responsive to locating said extendable means in said path to effect its swingable movement along and within said path as to compress said predetermined number of articles into a compact group, and means for moving said carriage means transversely across said conveyance path to transfer said group to a container loading station.

7. In a casing apparatus, conveying means for carrying a plurality of articles along a conveyance path, a frame, carriage means on said frame and disposed adjacent said path, means supported on said carriage means being normally disposed at a first position, intercepting and movable by said articles to a second position along said path, means swingably supported on said carriage means and normally disposed remote from said path to permit said articles to move therepast, said last named means being selectively extendable transversely of and into said path and operable with said intercepting means for separating a predetermined number of said articles, means responsive to locating said extendable means in said path to effect its swingable movement along and within said path as to compress said predetermined number of articles into a compact group, means for moving said carriage means transversely across said conveyance path to transfer said group to a container loading station, and means operatively connected with said intercepting means being responsive to the disposition of said group at said station to return said intercepting means to said first position.

8. In a casing apparatus, the combination therewith of conveying means for conveying a plurality of articles along a conveyance path; said apparatus comprising a frame, carriage means on said frame and disposed adjacent said path, means supported on said carriage means and disposed in said path, intercepting and movable by said articles along said path, means swingably supported on said carriage means and normally disposed remote from said path to permit said articles to move therepast, said last named means being selectively extendable transversely of and into said path and operable with said intercepting means for separating a predetermined number of said articles, means responsive to locating said extendable means in said path to effect its swingable movement along and within said path as to compress said predetermined number of articles into a compact group, and means for moving said carriage means transversely across said conveyance path to transfer said group to a container loading station.

9. In a casing apparatus, the combination therewith of conveying means for conveying a plurality of articles to be packaged along a conveyance path; said apparatus including a first member disposed in said path intercepting and moved by said articles along said path, a second member normally spaced from said path being movable transversely of and into said path to separate a predetermined number of said articles between it and said first member, means for moving at least one of said members along said path toward the other of said members to compress said separated articles therebetween, and means for moving said members and said separated articles transversely of said path to a container loading station.

10. In a casing apparatus, the combination therewith of conveying means for conveying a plurality of articles to be packaged along a conveyance path, said apparatus including a frame, carriage means movably supported on said frame and normally disposed adjacent said conveying means in an article grouping station, a first member on said carriage means normally disposed at said grouping station at a first position in said path, intercepting and movable to a second position by said articles along said path, a second member on said carriage means being selectively movable from a position remote from said path transversely of and into said path to separate a predetermined number of said articles between it and said first member, means for moving said second member along said path toward said first member to compress said separated articles, means for moving said carriage means from said grouping station effective to carry said separated articles to a container loading station, and means for returning said carriage means to said grouping station subsequent to the disposition of said separated articles at said loading station.

11. In a casing apparatus as defined in claim 10, and wherein means are provided to return the first member to its first position on said carriage means subsequent to the disposition of the separated articles at said container loading station.

12. In a casing apparatus as defined in claim 10 and wherein means are provided to move said second member to its remote position on said carriage means subsequent to the disposition of the separated articles at said container loading station.

13. In a casing apparatus, the combination therewith of conveying means for conveying a plurality of articles to be packaged along a conveyance path, said apparatus including a frame, carriage means movably supported on said frame and normally disposed adjacent said conveying means in an article grouping station, a first member on said carriage means normally disposed at said grouping station at a first position in said path, means for guiding said articles toward said grouping station, said first member intercepting and movable by said articles to a second position along said path, a second member on said carriage means being selectively movable from a position remote from said path transversely of and into said path to separate a predetermined number of said articles between it and said first member, means for moving said second member along said path toward said first member to compress said separated articles, means for moving said carriage means from said grouping station effective to carry said separated articles to a container loading station, means for returning said carriage means to said grouping station subsequent to the disposition of said separated articles at said loading station.

14. In a casing apparatus, the combination therewith of conveying means for conveying a plurality of articles to be packaged along a conveyance path, said apparatus including a frame, carriage means movably supported on said frame and normally disposed adjacent said conveying means in an article grouping station, a first member on said carriage means normally disposed at said grouping station at a first position in said path, intercepting and movable to a second position by said articles along said path, means connectable with said articles effective to stop the conveyance of the same along said path, a second member on said carriage means being selectively movable from a position remote from said path transversely of and into said path to separate a predetermined number of said articles between it and said first member, means for moving said second member along said path toward said first member to compress said separated articles, means for moving said carriage means from said grouping station effective to carry said separated articles to a container loading station, means for returning said carriage means to said grouping station subsequent to the disposition of said separated articles at said loading station.

15. In a casing apparatus, the combination therewith of conveying means for conveying a plurality of articles to be packaged along a conveyance path, said apparatus including a frame, carriage means movably supported on said frame and normally disposed adjacent said conveying means in an article grouping station, a first member on said carriage means normally disposed at said grouping station at a first position in said path, intercepting and movable to a second position by said articles along said path, means for agitating said articles in said path effective to stand said articles on an edge thereof, a second member on said carriage means being selectively movable from a position remote from said path transversely of and into said path to separate a predetermined number of said articles between it and said first member, means for moving said second member along said path toward said first member to compress said separated articles, means for moving said carriage means from said grouping station effective to carry said separated articles to a container loading station, and means for returning said carriage means to said grouping station subsequent to the disposition of said separated articles at said loading station.

16. In a casing apparatus, the combination therewith of conveying means for conveying a plurality of articles to be packaged along a conveyance path, said apparatus including a frame, carriage means movably supported on said frame and normally disposed adjacent said conveying means in an article grouping station, an article receiving platform in said path in position to receive said articles at said grouping station, a first member on said carriage means normally disposed at said grouping station at a first position in said path, intercepting and movable to a second position by said articles along said path, means for agitating said articles in said path effective to stand said articles on an edge thereof, a second member on said carriage means being selectively movable from a position remote from said path transversely of and into said path to separate a predetermined number of said articles between it and said first member, means for moving said second member along said path toward said first member to compress said separated articles, means for moving said carriage means from said grouping station effective to carry said separated articles to a container loading station, and means for returning said carriage means to said grouping station subsequent to the disposition of said separated articles at said loading station.

17. In a casing apparatus as defined in claim 16 and wherein the article receiving platform is inclined in the direction of conveyance of said articles.

18. In a casing apparatus as defined in claim 17 and wherein the article receiving platform is inclined within a range of 5–15 degrees in the direction of conveyance of said articles.

References Cited in the file of this patent

UNITED STATES PATENTS

| | | |
|---|---|---|
| 1,818,496 | Milmoe | Aug. 11, 1931 |
| 2,884,114 | Oberwelland | Apr. 28, 1959 |
| 2,954,881 | Hopton et al. | Oct. 4, 1960 |